May 26, 1959     O. J. SCHEMMEL     2,888,194
FLUID OPERATED COMPRESSORS, AND THE LIKE
Filed Aug. 8, 1955     6 Sheets-Sheet 1
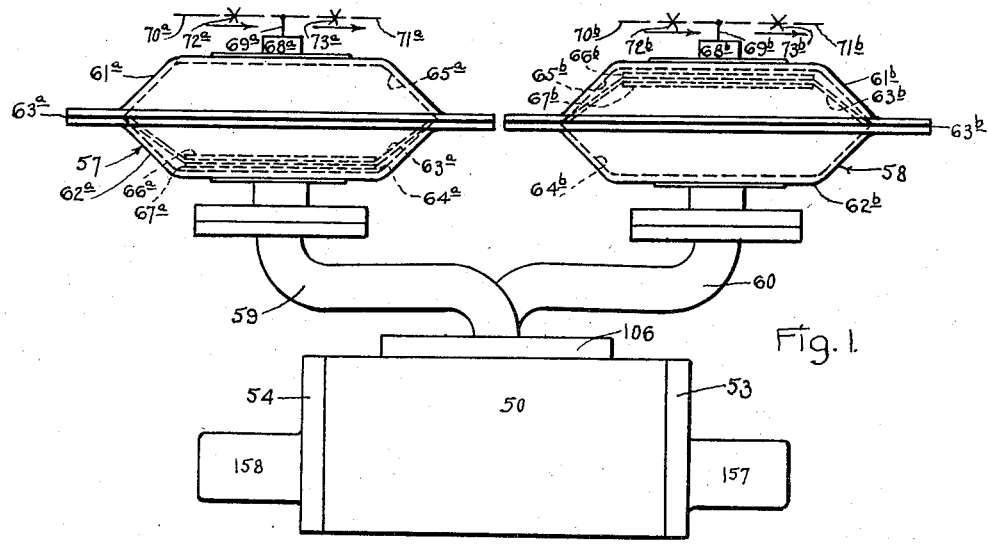
Inventor:
Otto J. Schemmel May 26, 1959  O. J. SCHEMMEL  2,888,194
FLUID OPERATED COMPRESSORS, AND THE LIKE
Filed Aug. 8, 1955  6 Sheets-Sheet 2
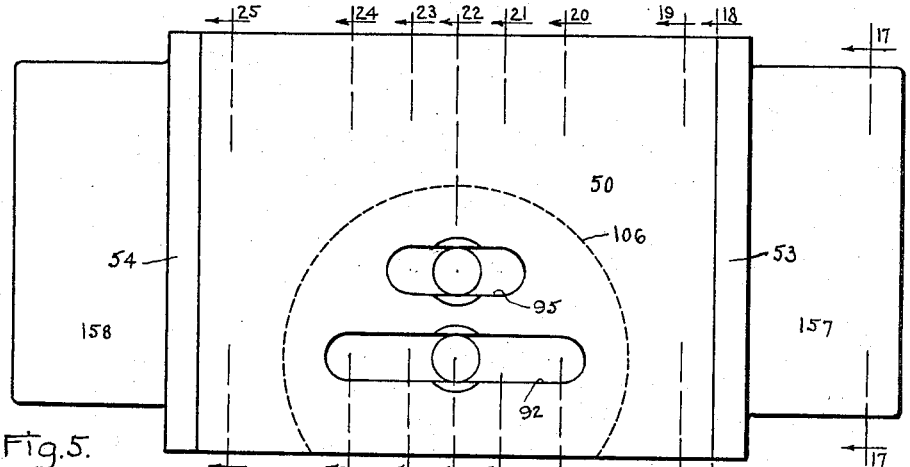
Fig. 5.
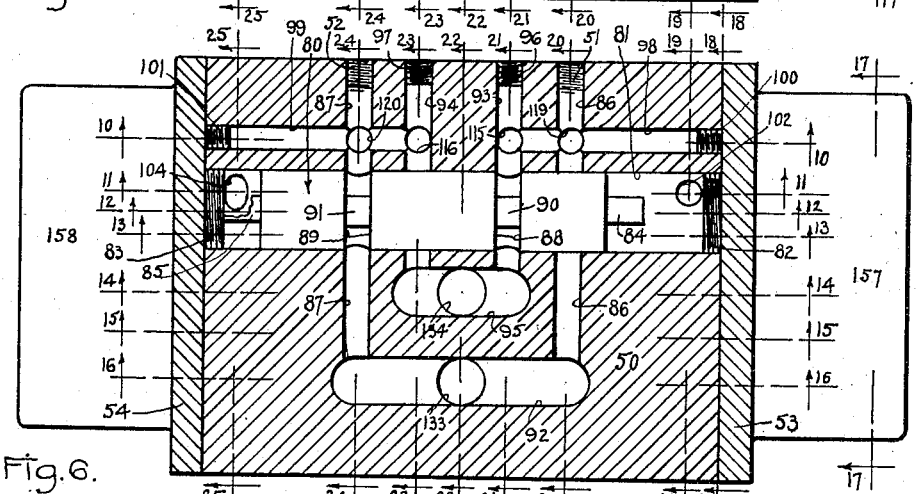
Fig. 6.
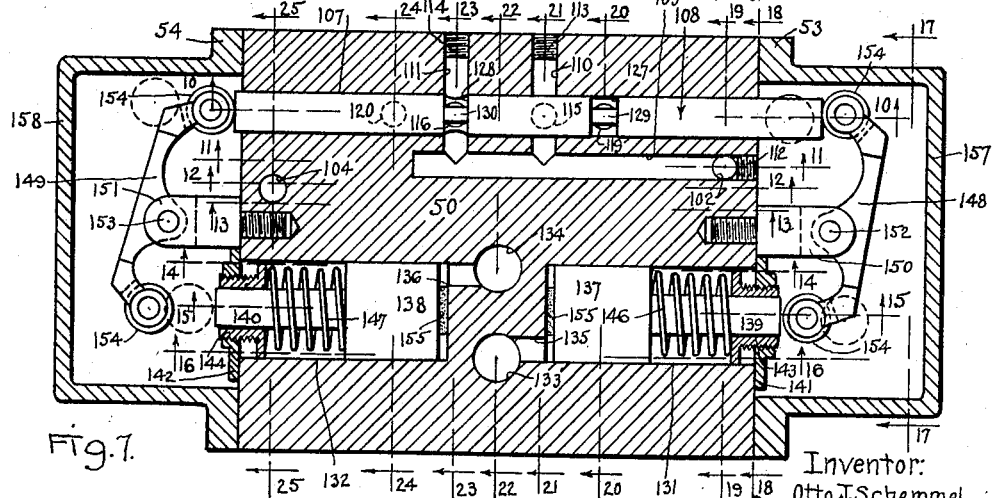
Fig. 7.
Inventor:
Otto J. Schemmel,

May 26, 1959        O. J. SCHEMMEL        2,888,194

FLUID OPERATED COMPRESSORS, AND THE LIKE

Filed Aug. 8, 1955        6 Sheets-Sheet 3

Inventor:
Otto J. Schemmel,

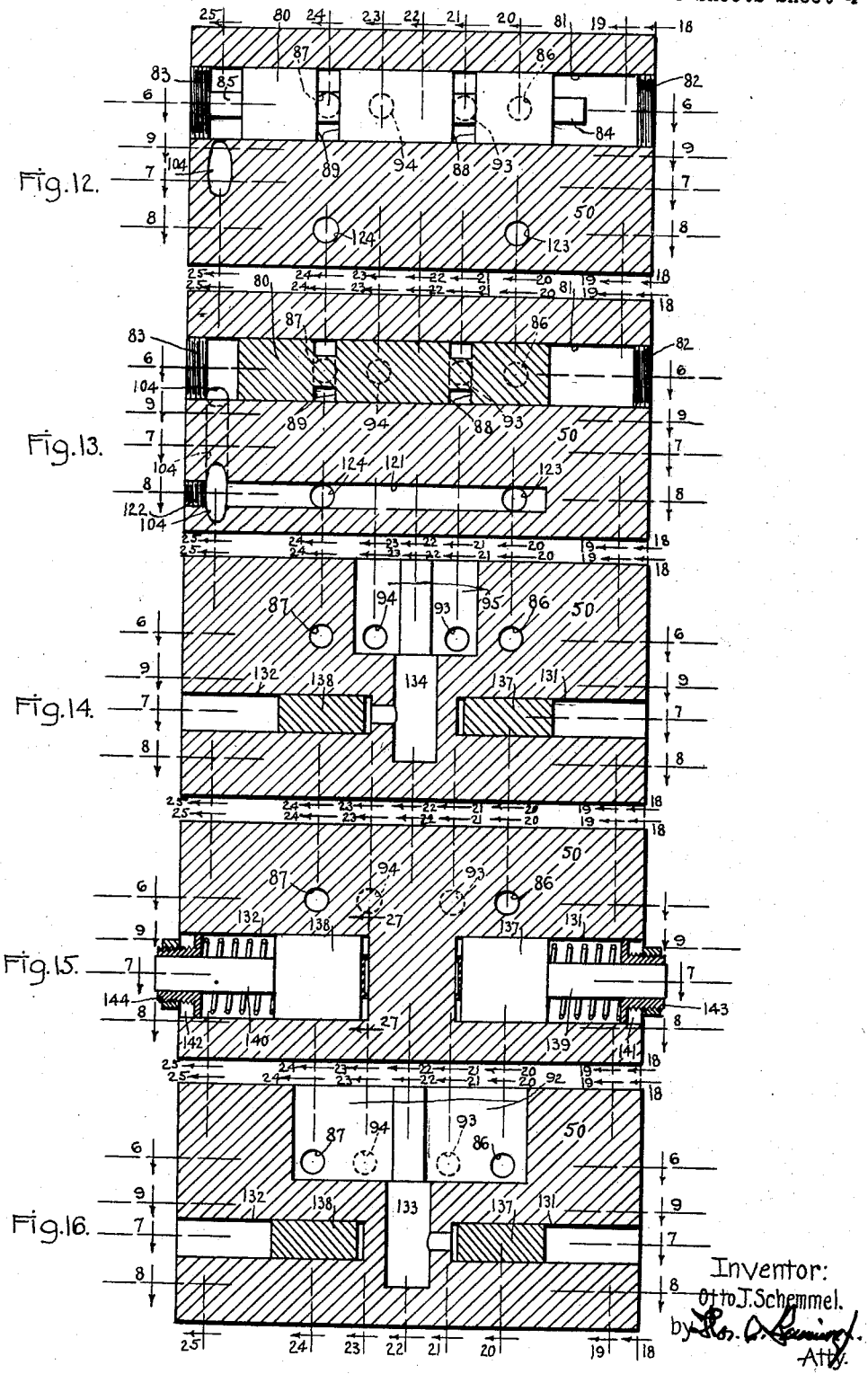

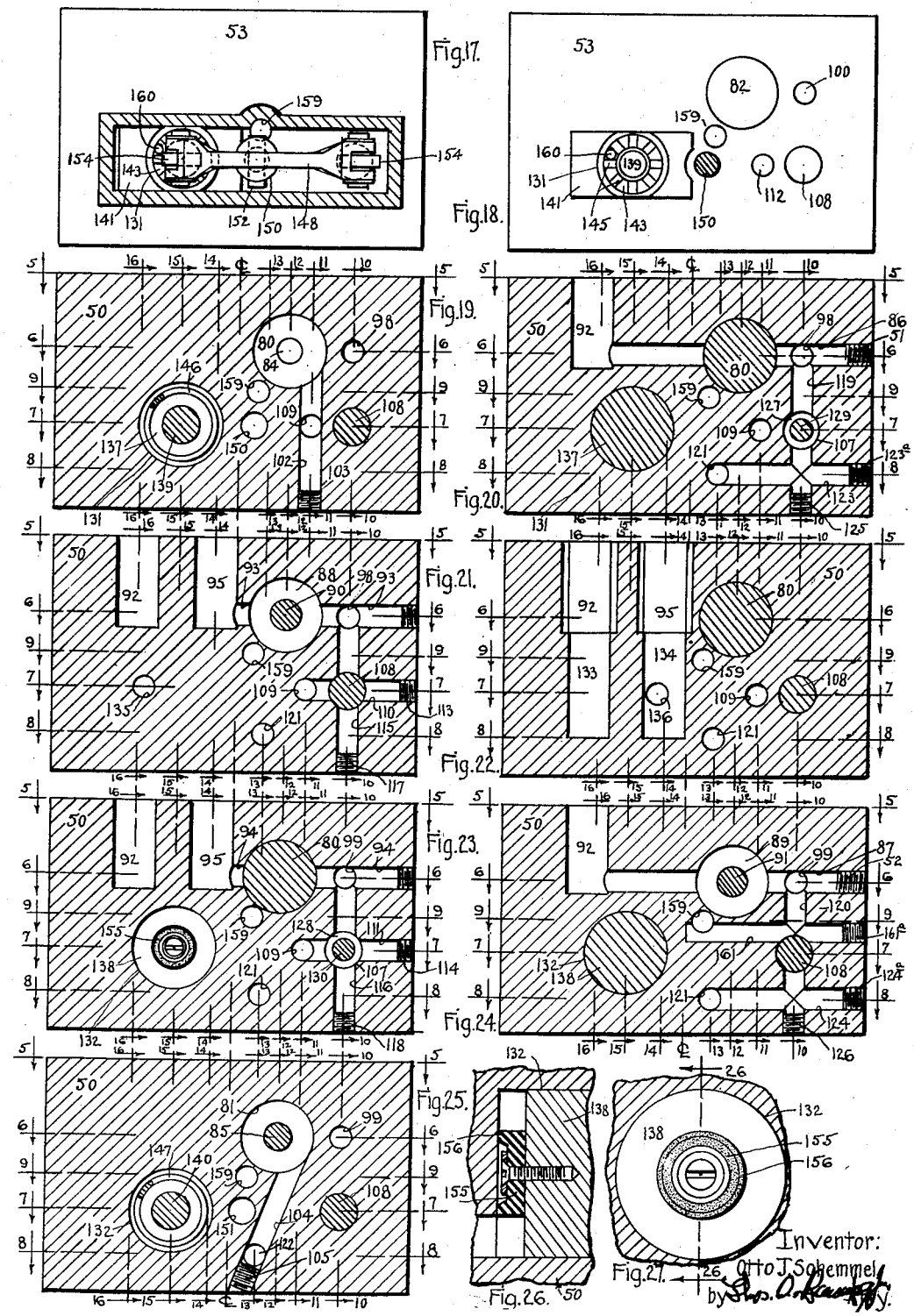

May 26, 1959   O. J. SCHEMMEL   2,888,194
FLUID OPERATED COMPRESSORS, AND THE LIKE
Filed Aug. 8, 1955   6 Sheets-Sheet 6

Inventor:
Otto J. Schemmel,
by
Att

United States Patent Office 2,888,194
Patented May 26, 1959

2,888,194
FLUID OPERATED COMPRESSORS, AND THE LIKE

Otto J. Schemmel, Chicago, Ill.

Application August 8, 1955, Serial No. 526,921

10 Claims. (Cl. 230—162)

This invention relates to improvements in fluid operated compressors, and the like. The compressors herein disclosed are designed primarily for compressing readily liquifiable gases such as are used for the production of refrigeration effects through the medium of expansion valve arrangements and heat exchangers, in well known manner. The compressors herein disclosed are intended for compressing the gases to the degree needed to change such gases from the vapor to the liquid phase. In mentioning such use, however, I do not intend to limit the construction or usefulness of the compressors to be herein disclosed in any manner, except as I may do so in the claims to follow.

The present invention relates primarily to certain improvements in the valve means whereby the driving liquid which is supplied under pressure from a suitable source is delivered to the compressor elements by which the gas or vapor is placed under compression. These compressor elements are driven or reciprocated back and forth in conventional movement under control of the valve system herein disclosed. To this end said valve system is provided with suitable passages for admitting the pressure driving liquid to each compressor element during the working stroke, and for releasing the liquid from such compressor element during the return stroke, according to well understood requirements. Generally two compressor elements are provided, working in alternation and in opposite directions during each half cycle; and the valve system is devised to ensure the proper sequence of admission and release of the driving liquid to gain the foregoing objective.

Since the driving liquid is substantially non-compressible provision must be and is made to ensure a quick or snap reversal of the valve mechanism at completion of each half cycle of movements, thus ensuring complete shift of the valve ports from the one position to the other position, without danger of stalling at the half-way valve position or some intermediate point. To this end, the device is provided with means to ensure full stroke of the driving and compressing elements at all times, and to ensure valve reversal at the completion of each full half-cycle movement.

The valve mechanism includes a main valve which controls the admission of driving pressure liquid to each compressor element in turn, with release of such liquid from each such compressor element at completion of the driving stroke, and during the return stroke of such compressor element. The valve means also includes a primary valve element which controls admission of driving liquid to position to actuate such main valve alternately in opposite directions, with release of driving liquid from actuation of such main valve at completion of the main valve's movement in each direction. Conveniently, the main valve takes the form of a piston valve unit, and is reciprocated back and forth under control of the primary valve. To this end the primary valve is itself reciprocable between two extremes of movement at which extremes the main valve is caused to reverse its position.

The arrangement is also such that the shifts of the primary valve are produced by a snap action at conclusion of each compressing movement of the compressor elements. By this arrangement there is assurance that each compressor element will execute a complete compressing movement before reversal of the valves, and also avoidance of liquid lock of any of the parts.

The reversals of the primary valve are effected by hydraulic pressure means deriving its hydraulic supply from the pressure source but under control of the movements of the compressor elements. I have herein disclosed two forms of arrangement in which the delivery of such pressure liquid to the primary valve actuation means is controlled in proper timing. According to one such means the actuation of the primary valve is produced when the pressure of liquid supplied to the compressor element has risen beyond a critical value at which the primary valve actuator functions. According to the other such means the actuation of the primary valve is produced when the compressor element has completed its predetermined and intended compressing movement on its working stroke. Actually, however, the first stated embodiment is of such construction that the pressure of the liquid supplied to the compressor element will rise to such critical value only when such compressor element has completed its full working stroke so that both embodiments of the invention are generically related to each other.

I have provided means to adjust the critical value of pressure at which the primary valve will be reversed to either position with its snap action. Such adjusting means is provided for shift of the primary valve in either direction independently of shift in the other direction; but the adjusting means for shift in each direction can be readily brought to position such that the shifting pressures in both directions are the same.

The compressor units herein disclosed are intended for use primarily in connection with compression of refrigerating vapors or gases in installations on refrigerated trucks and similar vehicles. The driving power is derived from oil or like fluid placed under pressure by a suitable pump carried by such truck or vehicle. The desirability of using such a source of drive for the compressor elements is known elsewhere, and need not be discussed at length here. However, when such a source of drive is used it is desirable to make provisions such that the same body of such oil or liquid may be used over and over, travelling through a closed circuit from the pump to the drive elements which drive the compressor elements, and then back to the pump for reuse. When the displacements of the two (or more) compressor drive elements are exactly equal, and when such elements operate in exact synchronism the liquid being supplied by the pump to one drive element is equal to that released and returned to such pump by the other drive element. Under these conditions of operation the liquid circuit may comprise a sealed circuit without need for provision of back and forth shifts of some liquid between such circuit and a suitable sump. However, there may arise conditions under which it is desirable to provide for small amounts of such back and forth shift between the closed liquid circuit and such a sump. I have made provision for such a sump, and for such small back and forth shifts of liquid in the present disclosures.

Other objects and uses of the invention will appear from a detailed description of the same, which consists in the features of construction and combinations of parts hereinafter described and claimed.

In the drawings:

Figure 1 shows a front elevational view of a typical embodiment of my present invention, and it shows by dotted lines one of the compressor element diaphragms in its work stroke completed position and the other compressor element diaphragm at the position of completion of its return stroke, ready for commencement of the next work stroke;

Figure 2 shows a plan view corresponding to Figure 1;

Figure 3 shows a left-hand end view corresponding to Figures 1 and 2;

Figure 28:
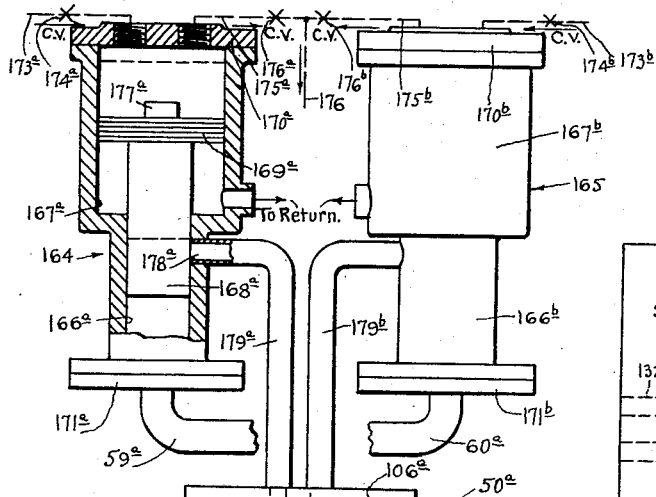
Figure 29:
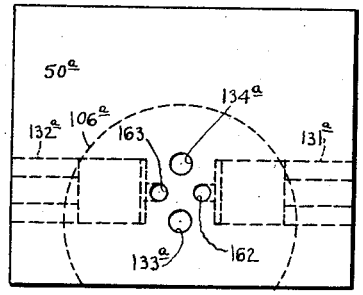
Figure 30:
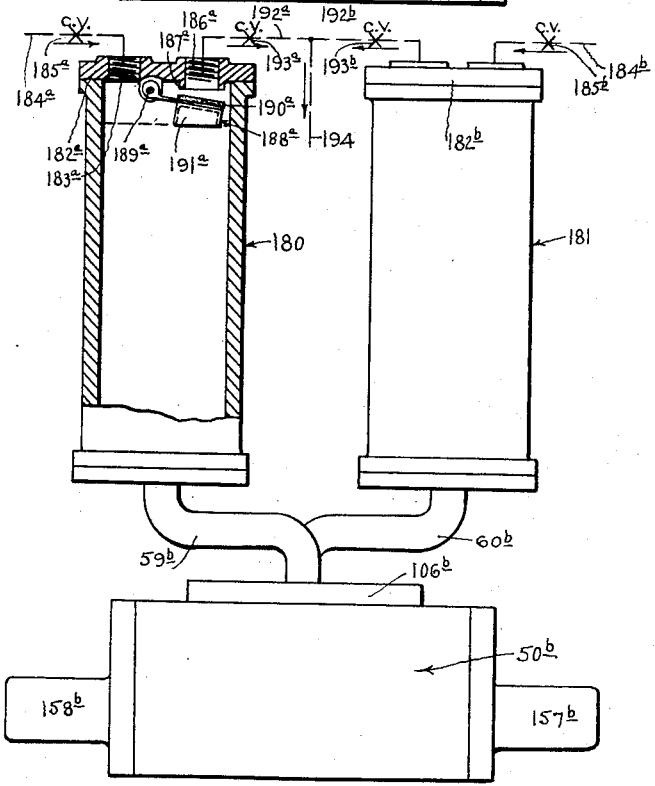

Figure 4 shows a back elevational view of the valve element of the device of Figures 1, 2 and 3, the compressor elements being removed to reduce the size of the figure; and this figure also shows schematically a simple closed conduit circuit for the drive liquid, including in such circuit a conventional centrifugal motor driven pump for placing the drive liquid under pressure differential, and also shows a simple form of liquid sump in the pressure side of the circuit in advance of the compressor unit, such sump being capable of receiving slight excesses of liquid on some portions of the operating cycle, and releasing such liquid back into the liquid circuit on other portions of the operating cycle; such sump being of a closed and air trapped type;

Figures 5, 6, 7, 8 and 9, are horizontal sections through the valve unit, taken on the lines 5—5, 6—6, 7—7, 8—8 and 9—9 of Figures 4 and 10 to 16, and 19 to 25, inclusive;

Figures 10, 11, 12, 13, 14, 15 and 16 are vertical longitudinal sections through the valve unit, taken on the lines 10—10, 11—11, 12—12, 13—13, 14—14, 15—15 and 16—16 of Figures 6, 7, 8 and 9, and 19 to 25, inclusive;

Figure 17 is a vertical cross-section taken on the line 17—17 of Figures 5, 6 and 7;

Figures 18, 19, 20, 21, 22, 23, 24, and 25 are vertical cross-sections taken on the lines 18—18, 19—19, 20—20, 21—21, 22—22, 23—23, 24—24 and 25—25 of Figures 5, 6, 7, 8, and 9;

Figure 26 is an enlarged detail section of the end of one of the primary valve shifting plungers taken on the line 26—26 of Figure 27, looking in the direction of the arrows;

Figure 27 is a fragmentary section on enlarged scale, taken on the line 27—27 of Figure 15, looking in the direction of the arrows;

Figure 28 is a schematic front elevational view of another embodiment of the present invention in which the compressor elements comprise cylinder and plunger elements in place of diaphragms such as previously illustrated herein, each such cylinder and plunger element including a driving plunger of small size directly connected to a driven piston of larger size, to thus produce compressing action on the refrigerating medium at smaller pressure and larger volume than the pressure and volume of the driving liquid, respectively; and in this case the delivery of liquid to the primary valve operating plungers is directly controlled by the completion of the full intended strokes of the compressor plunger and piston elements;

Figure 29 is a horizontal section taken on the line 29—29 of Figure 28, looking in the direction of the arrows; and Figure 30 is a schematic front elevational view, partly in section, of a second modification in which each of the refrigerating medium compressing elements comprises a vertical cylinder into which oil under pressure is admitted and rises against the refrigerating medium which is directly above and in contact with the surface of such rising oil and thus driven by such oil and under the pressure thereof; and in this figure I have shown a form of float valve within the cylinder and in position to be raised by the rising oil within such cylinder just prior to completion of the full driving stroke of the rising oil, to thus prevent out delivery of drive oil into the delivery line of the compressed refrigerating medium.

Referring to Figures 1, 2, 3 and 4, I have therein shown a typical unit embodying the features of my present invention. This embodiment includes a valve section 50, which, as indicated in Figure 4, is provided with pressure and release drive oil connections 51 and 52, respectively. In this figure there are also shown a number of passage termini which, however are plugged, as will hereinafter appear, and these passages are provided largely as a matter of convenience in manufacture and to provide various internal liquid passages needed during the functioning of the device. The two end plates 53 and 54 are attached to the ends of the section 50, and these end plates serve as enclosures for certain valve operating elements, presently to be described.

The section 50 is provided with two top openings or connections 55 and 56 to which pumping elements 57 and 58 for refrigerating medium are connected by the pipes 59 and 60. In the embodiment shown in Figures 1, 2, 3 and 4, these pumping elements comprise diaphragm units. Each unit includes the top and bottom cup shaped elements 61 and 62 having their peripheral portions clamped tightly against the peripheral portion of a flexible diaphragm 63 in conventional manner. Thus each unit includes a lower drive liquid chamber 64 and a higher driven medium chamber 65, and each chamber will vary in capacity as the diaphragm is deflected up and down. The diaphragm of each unit is preferably reinforced by top and bottom plates 66 and 67, respectively, of size which will ensure good performance during the pumping up and down operations, according to conventional practice. Upon admitting drive liquid under pressure into each of the lower chambers 64 the corresponding diaphragm will be forced up for delivery of a volume of refrigerating medium substantially equal to the volume of drive liquid thus admitted to the chamber 64 and under delivered pressure substantially equal to the pressure of the drive liquid minus a loss due to stiffness of the diaphragm and frictional losses. It is here noted that upward or working stroke movement of each diaphragm is limited by engagement of such diaphragm with the top of the corresponding chamber 65, so that further delivery of the refrigerating medium from such chamber on such stroke is prevented. Such diaphragm must then be returned to its lower flexed position preparatory to the next effective pumping movement. In Figure 1 the right-hand diaphragm is shown in its fully raised position, and the left-hand diaphragm is shown in its fully lowered position. The next pumping operation will comprise upward drive of the left-hand diaphragm with corresponding lowering of the right-hand diaphragm.

The lowering of each diaphragm may be effected in either of several ways. Spring means may be provided in each unit normally urging its diaphragm to lowered position, or differential of pressure against the upper and lower faces of the diaphragm may be relied on to produce the desired effect. In the showing of Figure 1 the latter arrangement is relied on, as shown by the following statement:

The top of each chamber 65 is provided with a nipple 68 to which may be connected a supply and delivery line 69. (It is noted that the suffixes "a" and "b" have been applied to numerals designating elements of the left-hand unit 57 and of the right-hand unit 58, respectively, for convenience of identification). Supply connections 70 are connected to the nipples 68, and delivery connections 71 are also connected to said nipples, in each case through the medium of the common connections 69 for such nipples. The check valves 72 and 73 are included in these connections, and these check valves are all set into their respective lines in such manner that their several permitted directions of fluid flow are as indicated by the arrow heads adjacent to such valves, respectively. It is intended that both of the lines 70ª and 70ᵇ shall be connected to the low pressure side of the expansion valve and condenser elements of the refrigerating unit supplied with compressed refrigerating medium by the present device; and that both of the lines 71ª and 71ᵇ shall be connected to the high pressure or refrigerating medium supply side of the expansion valve and condenser unit of such refrigerating unit. Accordingly, the medium coming to the connections 70ª and 70ᵇ is of low pressure, and the medium being delivered through the connections 71ª and 71ᵇ is of higher pressure, high enough in fact to ensure condensation of the medium to the liquid phase during the refrigerating cycle. But it is noted that the vaporous or gaseous medium coming to the connections 70ª and 70ᵇ is of sufficient absolute pressure to ensure depression of each of the diaphragms when the valve mechanism presently to be described in brought to a corresponding position in the cycle of valving operations. Thus the need of springs to ensure downward or return of the diaphragms is usually obviated. They may be provided, if desired.

With the foregoing explanation the following operations will so far occur during a pumping cycle:

Release of pressure drive liquid from the lower face of the right-hand diaphragm 63ᵇ will allow such diaphragm to be moved down by the absolute pressure of low pressure medium coming through the connection 70ᵇ, and such down forcing of such diaphragm will discharge the drive liquid from beneath such diaphragm through the valve unit. Reference to Figure 4 shows that such so-discharged drive liquid will be delivered through the port 52 and over the line 74 to the supply connection of the centrifugal pump 75 driven by the motor 76, generally at adjustable speed by a suitable speed control, not illustrated. From the high pressure delivery side of this pump the drive liquid is delivered over the line 77 to the inlet or supply port 51 of the valve unit 50. Preferably a sealed sump element 78 is connected to the pressure delivery line 77 by the connection 79. This sump comprises a sealed chamber of air to which the connection 79 comes at a point at or near the bottom of the sump. Accordingly the entrapped air will be compressed to a volume corresponding to the absolute pressure of the delivered liquid; and also such sump will serve to receive slight excesses of pressure oil on occasion and to return such excesses back into the system afterwards, to thus retain the system full at all times. This matter will be referred to again hereinafter.

When the differentials of volume of the two diaphragm chambers 64ª and 64ᵇ are exactly equal between their fully lowered and fully raised positions of the diaphragms, it is evident that at each rising stroke of one diaphragm and corresponding lowering stroke of the other diaphragm the latter diaphragm will return to the valve system exactly as much drive liquid as was moved from such valve system into the space beneath the rising diaphragm during such half-cycle, so that the total amount of drive liquid needed in the system will remain unchanged. If a like condition also obtains during the second half of the cycle the total drive liquid needed in the system will still remain unchanged. If, however, either of the diaphragm proportions and its movements are unequal to like factors of the other diaphragm there will occur cyclic changes of the total amount of liquid needed in the system, such cyclic changes comprising slight discharges of drive liquid from the system on one portion of each cycle and corresponding returns of like amounts of the liquid to the system on the other portions of the cycles. Any such slight inequalities of volume will be compensated for by slight movements into and deliveries from the pressure sump 78. In this connection the following further explanation of the valve operations presently to be described in full detail is in order:

Assuming that the diaphragms have attained the position shown in Figure 1; upon shifting the valve mechanism quickly to reversed position drive liquid will be admitted through the pipe 59 to the space 64ª beneath the diaphragm 63ª, or, said space being already filled with drive liquid, the pressure therein will be increased. Such increase of pressure will be sufficient to drive the diaphragm upwardly with corresponding delivery of refrigerating medium from the space 65ª and out through the connection 71ª to the refrigerating unit. Such discharge of compressed refrigerating medium will continue until the diaphragm 63ª reaches its highest attainable position. At the same time, the valve unit having been brought to the position just referred to for such operation of the diaphragm unit 63ª, release of drive liquid from beneath the diaphragm 63ᵇ of the companion unit 58 may occur, with corresponding lowering of the diaphragm 63ᵇ. Such lowering will be induced by the differential between absolute pressures above and below such diaphragm 63ᵇ. The pressure below is that of the intake side of the pump 75 (minus conduit losses), and the pressure above is that of the expanded refrigerating medium present through the connection 70ᵇ and check valve 72ᵇ. Thus said diaphragm 63ᵇ will move down, following the release of drive liquid from beneath its lower surface. The foregoing operations will continue until the valve unit reverses its valve elements, and that reversal will occur when the diaphragm 63ª reaches its upper permissible limit of movement. Such upper limit will be either that position at which the diaphragm has now been fully distended, or, if such full distention has not yet occurred, then such upper limit of movement will be that at which the top surface of such diaphragm contacts against the lower surface of the chamber 65ª. In either case the drive liquid arriving at the lower chamber 64ª of the unit 57 will be arrested in its flow into such chamber, and at such instant the drive pressure arriving through the pipe 59 will rise to the full delivered pressure coming from the pump 75. This raised pressure will be encountered also in the valve unit and produce the desired reversal of valves as will presently appear. It is here noted that in the modified arrangement shown in Figures 28 and 29 the reversal of valving will occur when the drive plunger arrives at its high position, regardless of the rise of pressure such as above explained; but it is noted that the rise of pressure occurring in the embodiment first to be described in detail hereinafter also occurs when the drive element attains its highest driving position, such as the position of the diaphragm 63ᵇ.

At the same time that the diaphragm 63ª attains its high limit of movement the diaphragm 63ᵇ will attain its low limit of movement. Thus, when the valve reversal occurs the diaphragm 63ᵇ will be in position with a full complement of refrigerating medium contained in its chamber 65ᵇ and ready to perform a full delivering operation against such refrigerating medium.

Reference is now had to Figures 5 to 27, inclusive, which illustrate the valve unit in detail:

At the level of the plane 6—6 (see various figures) there is provided a main valve element 80 in the form of a reciprocable valve element working in a cylindrical chamber 81 of the block 50. This chamber is conveniently produced by boring lengthwise through the block 50 and plugging the ends of such chamber after the valve element has been set into the chamber. Such plugs are shown at 82 and 83 in Figure 6, and elsewhere. This main valve is provided with end lugs 84 and 85 to limit its movements in both directions, so that it will not overrun its intended endwise movements for valving operations to be presently explained. (The lug 84 is partly broken away in Figure 6 to avoid concealing a port presently to be described.)

At the plane 6—6 there are provided the inlet and outlet or release passages 86 and 87, which terminate in the ports 51 and 52 which appear in Figure 4. These passages extend forwardly through the valve block 50 to locations substantially beneath the port or opening 56 to which the pipe 59 is connected (or to lateral extensions of such port, as will presently appear). Said passages 86 and 87 intersect the chamber 81 as is evident from Figures 6 and 20 and 24, respectively. But the valve member 80 determines the valving connections between the passages 86 and 87, and the chamber ends of the chamber 81. To this purpose said valve member 80 is provided with the annular recesses or grooves 88 and 89 as shown in Figures 6, 21 and 24, the several portions of the valve member being connected together by the reduced sections 90 and 91. The grooves 88 and 89 are so located in the length of the valve member that when such valve member stands in the extreme position shown in Figure 6 the continuity of the passage 87 from the port 52 to the front portion of the valve block is uninterrupted but the continuity of the passage 86 is interrupted as shown in Figure 6. The port 56 communicates with a laterally enlarged space 92 formed in the valve block and which space is of lateral dimension sufficient to receive both of the passages 86 and 87 at their front ends as shown in Figure 6.

At the level of the section of Figure 6 (being the level 6—6), there are also provided the two forwardly extending passages 93 and 94 located intermediate between the passages 86 and 87. These passages also intersect the valve chamber 81, and they reach from the back face of the valve block to a laterally enlarged space 95 which communicates with the port 55 to which the pipe 60 connects. These passages 93 and 94 are conveniently formed by drilling the valve block from its rear face and then plugging the rear ends of such passages by the plugs 96 and 97.

Also at the level 6—6 of the Figure 6 there are provided the two passages 98 and 99 which extend endwise into the valve block from the two ends and said passages are preferably formed in alignment with each other but do not come together at their inner ends. The passage 98 intersects both of the passages 86 and 93, and the passage 99 intersects both of the passages 87 and 94. These passages 98 and 99 are conveniently formed by drilling the valve block from its two ends and then plugging the ends of such passages by the plugs 100 and 101 as shown in Figure 6 and elsewhere. These passages 93 and 94 are so spaced with respect to the passages 86 and 87 that when the valve member 80 stands in the position shown in Figure 6 wherein the continuity of the passage 86 is interrupted, lateral communication is provided from the passage 86 to the passage 93, and lateral communication is provided from the passage 87 to the passage 94; and also when said valve member stands in such position the passage 93 is made continuous to the lateral enlargement 95 by the groove 88 of the valve member, but the continuity of the passage 94 is interrupted by the valve member in such position.

Shift of the valve member 80 to its oppositely limited position (rightwardly in Figure 6) will result in bringing the groove 88 into registry with the passage 86 and interrupting the continuity of the passage 87; and will also result in bringing the groove 89 into registry with the passage 94 and interrupting the continuity of the passage 87. In the valve position shown in Figure 6 it is evident that the drive pressure port 51 is in communication with the lateral space 95, and thus with the pipe 60, and that the return port 52 is in communication with the lateral space 92, and thus with the pipe 59. Under these conditions drive pressure liquid has been admitted beneath the diaphragm 63b, driving it up to its high position as shown in Figure 1, and the space beneath the diaphragm 63a has been in communication with the return port 52, thus permitting return of liquid from beneath such diaphragm 63a synchronously with the up movement of the other diaphragm. Upon shift of the valve member 80 to the right the connections between the ports 51 and 52, and the spaces beneath the two diaphragms will be reversed, as will be evident from study of Figure 6 in particular.

At its right-hand end (as viewed in Figure 6) the passage or valve chamber 81 is in communication with a vertical passage 102 which is drilled up from the bottom face of the valve block as shown in Figure 19 and has its lower end plugged as therein shown at 103. This vertical passage communicates with another passage by which pressure liquid can, on occasion, be supplied to produce valve shifting pressure against the right-hand end of the valve member 80. Likewise, at its left-hand end (as viewed in Figure 6) the valve chamber 81 is in communication with a downwardly slanting passage 104 which is drilled up from the bottom face of the valve block as shown in Figure 25 and has its lower end plugged as therein shown at 105. This slanting passage communicates with another passage by which pressure liquid can, on occasion be supplied to produce valve shifting pressure against the left-hand end of the valve member 80. As will presently appear, these passages 102 and 104 are supplied with pressure liquid, or are placed in connection with release passages, alternately at completion of the working or upward strokes of the diaphragms 63a and 63b respectively. Thus the shifts of the main valve are produced as needed, and as will hereinafter appear in detail.

At this point it is noted that both of the pipes 59 and 60 are brought to a common plate 106 which is drilled in alignment with such pipes, or to which such pipes are thus connected; and this plate is secured to the top face of the valve block with such pipes 59 and 60 in registry with the laterally enlarged spaces 92 and 95 to which reference has already been made. Such attachment of the plate 106 to the valve block is made in such manner as to produce liquid tight seals from the pipes to the lateral enlargements, respectively.

The means to supply pressure liquid to the passages 102 and 104 for control of the main valve 80 are as follows:

Referring first to Figure 7 which is a horizontal section on the plane 7—7 there is shown the longitudinally extending relatively small bore 107 in which is slidably mounted the primary valve element 108. This valve element comprises a rod of length somewhat greater than the length of the valve block so that such rod extends beyond both ends of the valve block and may be shifted back and forth for valving purposes while leaving some rod projection at each end of the block at all times. At the level of Figure 7 there is provided a passage 109 extending leftwardly into the valve block far enough to register with other passages which are formed in the valve block beneath the passages 93 and 94. These other passages are shown at 110 and 111, respectively in Figure 7. They intersect the bore 107 for the primary valve member, and they also intersect and communicate with the passage 109. Conveniently the passage 109 is drilled leftwardly into the valve block and has its right-hand end plugged as shown at 112, and the passages 110 and 111 are drilled forwardly in the valve block from its rear face and have their outer ends plugged as shown at 113 and 114, respectively. Vertical passages 115 and 116 are drilled upwardly in the valve block from its bottom face to intersect with the primary valve bore 107 and with the passages 93 and 94, respectively. The lower ends of these passages 115 and 116 are plugged as shown at 117 and 118, respectively.

Figure 8:
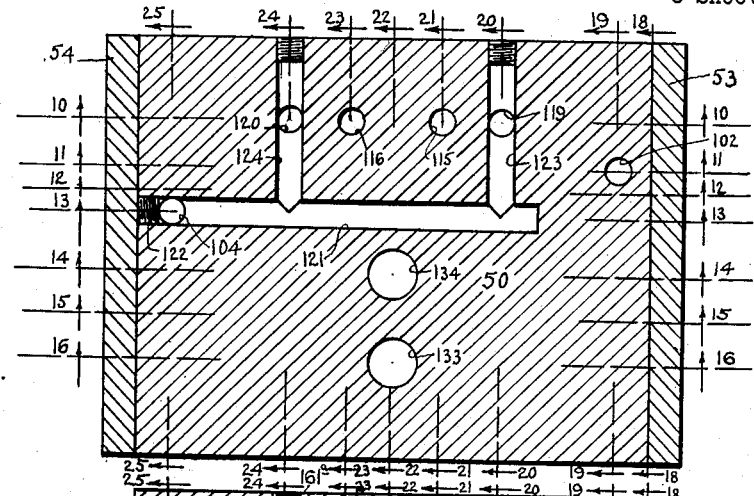

Other vertical passages 119 and 120 are drilled upwardly in the valve block from its bottom face to intersect the primary valve bore 107 and also to intersect the passages 86 and 87, respectively, as shown in Figures 20 and 24, respectively. A horizontal passage 121 is drilled longitudinally in the valve block from its left-hand end as shown in Figure 8, and the left-hand outer end of this passage is plugged as shown at 122. This passage 121 is at a lower level than the passage 109, being at the level of the horizontal section 8—8 shown in Figure 8. Two horizontal passages 123 and 124 are drilled forwardly in the valve block from its rear face at the level of the passage 121 and directly beneath the passages 86 and 87 shown in Figure 6. These passages 123 and 124 intersect the passage 121, and the passage 123 also intersects the vertical passage 119, and the passage 124 also intersects the vertical passage 120, as shown in Figures 20 and 24, respectively. The lower ends of these passages 119 and 120 are plugged as shown at 125 and 126, respectively.

The primary valve member 108 is provided with two encircling grooves 127 and 128 which are spaced apart a distance equal to the spacing between the vertical passages 119 and 116, and also equal to the spacing between the vertical passages 115 and 120. Reduced diameter neck portions 129 and 130 connect the proximate portions of the primary valve together as evident from Figure 7.

With the so-far described arrangements it will be evident that the port 104 for the left-hand end of the main valve shift (see Figure 6) is shown as connected to the pressure supply port 51 in the following manner; port and passage 104, down to passage 121 (Figure 8), passage 123, up through passage 119 (Figure 20), through groove 127 of primary valve member, to passage 86 which terminates (or begins) with the pressure port 51. At the same time the port 102 for the right-hand end of the main valve shift (see Figure 6) is shown as connected to the release port 52 in the following manner; port and passage 102, down to passage 109 (Figure 7), passage 111, through groove 128 of the primary valve member, passage 116, up to passage 99, laterally to passage 87, and to port 52 which is the release port. Thus, with the parts in the position shown in the described figures the main valve will be shifted to the right from its position shown in Figure 6. Study of the various passages and other elements will show that when the primary valve is shifted rightwardly from its position shown in Figure 7 the pressure connection will be established to the right-hand end of the main valve, and the release connection will be established to the left-hand end of such main valve. In all cases, however, the controls of pressure and release to the two ends of the main valve are produced by shifts of the primary valve. These shifts are produced in the following manner:

Reference to Figure 7 shows the two cylinders 131 and 132 extending longitudinally inwardly of the valve block from its right and left hand ends, respectively. These cylinders are both bored into the valve block at the same level as the primary valve, being the level of the section 7—7 and Figure 7. These cylinders are in lateral alignment with each other, but they do not come together at their inner ends. A vertical passage 133 extends down from the floor of the laterally enlarged portion 92 of the port 56 to which the pipe 59 connects, and another vertical passage 134 extends down from the floor of the laterally enlarged portion 95 of the port 55 to which the pipe 60 connects. These two vertical passages are spaced apart from each other in the front to back direction of the valve block, and they are also located between the inner ends of the two cylinders 131 and 132, as shown in Figure 7. Short horizontal passages 135 and 136 connect the passages 133 and 134 with the inner ends of the cylinders 131 and 132, respectively. It is thus evident that whatever pressure exists in either of the pipes 59 and 60 will be simultaneously produced in the corresponding cylinder 131 or 132; and since the pressures existing in said pipes 59 and 60 are also the pressures being developed against the lower faces of the diaphragms 64a and 64b, respectively, it follows that the diaphragm pressures are at all times communicated to the respective cylinders.

Plungers 137 and 138 work in the respective cylinders, and the plunger rods 139 and 140 extend from these plungers laterally beyond the side faces of the valve block as well shown in Figure 7. Plates 141 and 142 are secured to the outer faces of the ends of the valve block over the respective cylinders, but these plates are wide enough to carry slight enlargements surrounding the proximate portions of the plunger rods; and adjustment plates 143 and 144 are seated into the outer end portions of the cylinders, such plates comprising flange portions within the cylinder ends, and necks which are threaded into the plates 141 and 142, respectively so that the flanges of the plates 143 and 144 may be adjusted longitudinally of the respective cylinders. Such adjustments may be conveniently made by use of spanner wrenches engaged with notches 145 formed in the threaded portions of the plates 143 and 144 as evident from Figure 18 in particular.

Compression springs 146 and 147 are set between the outer ends of the plungers 137 and 138 and the inner faces of the flanges which comprise portions of the plates 143 and 144. These springs constantly urge the respective plungers inwardly to stopped positions against or near to the inner ends of the cylinders; and in Figure 7 both plungers are shown in such inwardly shifted positions, being their normal positions under the spring urge. These springs are pre-loaded by proper adjustments of the plates 143 and 144 so that liquid pressure being exerted against the inner plunger ends will not start outward plunger shift until such hydraulic pressures attain a prescribed value. When that condition of pressure is attained plunger shift outwardly can and will occur. It is here noted that such plunger shifting hydraulic pressures are the pressures existing against the lower faces of the diaphragms 63a and 63b, as previously explained. Accordingly, the plunger shifts are directly related to and dependent upon the pressures momentarily existing beneath the corresponding diaphragms. With the arrangement so far described it is evident that by pre-loading the springs to selected values the compressing effects will be adjustable to desired values, and that functioning of the plungers will occur at pre-selected values of hydraulic pressure being developed beneath the respective diaphragms.

Rock arms 148 and 149 are carried by studs 150 and 151 by the pivot pins 152 and 153. The ends of these rock arms carry rollers 154 which are positioned to engage the ends of the plunger rods and the ends of the primary valve as is evident from examination of Figure 7. The parts are so proportioned that when the left-hand plunger rod 140, for example, is projected leftwardly against the force of the corresponding spring 132 the rock arm 149 is rocked clockwise to shift the primary valve member into the position shown in Figure 7. This action will also serve to rock the rock arm 148 into the position shown in that figure. When at completion of the half-cycle of operations, the plunger rod 139 is shifted suddenly rightward against the spring 146 the rock arm 148 will rock counterclockwise, thus driving the primary valve member leftwardly, and at the same time rocking the rock arm 149 counterclockwise. Thus the primary valve is shifted alternately to the right and to the left, by impulses delivered alternately by the two plungers 137 and 138. The following comments are now in order:

Since the shifting of the primary valve depends on the rise of hydraulic pressure against the plunger 137 or 138, as the case may be, it is evident that movement of such plunger will not commence until that hydraulic pressure has risen to the value needed to overcome the pre-loading of the corresponding spring. At that time, further rise of the hydraulic pressure will produce gradual shift of the primary valve through the intermediary of the corresponding rock arm. Such a gradual shift might in some cases produce movement of the primary valve only to a cut-off point between delivery of pressure liquid to the new diaphragm and discontinuity of such delivery from the previous diaphragm. Thus the device might become stalled since neither diaphragm would receive hydraulic pressure liquid. To avoid such a possibility I have made the following provision:

To the back or inner face of each plunger there is secured a disk shaped element 155 of diameter somewhat less that that of the plunger proper. In the illustrated embodiment such diameter is substantially one-half that of the plunger itself. Each of these disks preferably comprises some slightly compressible material such as neoprene or other material not subject to deterioration by the drive liquid which will generally comprise some kind of oil. One of the semi-plastic silicones would provide a suitable material for formation of these disks. Each disk is preferably relieved on its rearwardly facing surface to provide a rather narrow encircling ridge 156 which will contact the inner end wall of the corresponding cylinder 131 or 132, as the case may be when the plunger is set full back into its cylinder by the spring after the cylinder has been connected to the return port 52 as already explained. Accordingly, when each plunger is standing in its normal and restored position (as shown in Figure 7), these disks will be in engagement with the inner end walls of the cylinders, thus preventing pressure liquid from coming into engagement with the area covered by each disk. Such being the case the effective area of the plunger is correspondingly reduced to the area of the annulus exposed to hydraulic pressure. Thus, in order to commence plunger movement against the pre-load of its spring the pressure must rise to that amount needed to overcome such spring preload when such hydraulic pressure is being exerted against only the exposed annulus of area of the plunger end. Once the plunger commences to move against the spring the edge portion 156 of its disk will be freed from engagement with the cylinder and so that hydraulic pressure will now be exerted against an additional area equal to the area of the disk element. This sudden increase in the effective area subject to hydraulic pressure will result in a sudden increase in total force developed against the plunger so that the plunger must move a substantial distance against the spring to restore the condition of balance of forces. By proper proportioning of the size of the disk 155 there will be assurance that the plunger will always be suddenly driven a stroke sufficient to ensure complete shift of the primary valve from its previous position to its new position, thus avoiding any possibility of such stalling as hereinbefore suggested.

The rock arms 148 and 149 at the two ends of the valve block, and related elements, are enclosed by removable extensions 157 and 158, respectively. Each of these is provided with an inwardly extending flange which comes to and is secured to the proximate end face of the valve block. Any leakage of drive oil or other liquid emerging from the ends of the valve passage 107 for the primary valve, or from the cylinders 131 and 132 due to leakage past the plungers 137 and 138, will be received within these extension members and prevented from loss. It is noted that as the primary valve member 108 shifts back and forth the available space contained within one end extension will be reduced and the available space contained within the other end extension will be correspondingly increased with each primary valve shift half-cyclically. Accordingly, I have provided a through passage 159 extending endwise through the length of the valve block and directly connecting said end extension spaces together. Thereby pressures within such end spaces are balanced at all times, and a free interchange of drive liquid between said end spaces is provided for. (See Figure 9 and others.)

Figure 9:
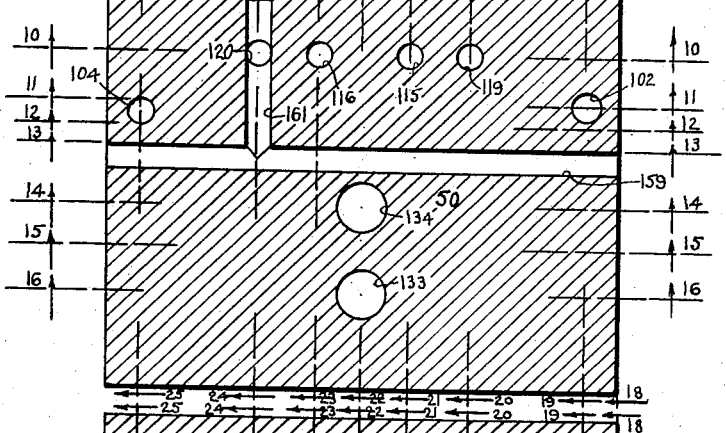
Figure 10:
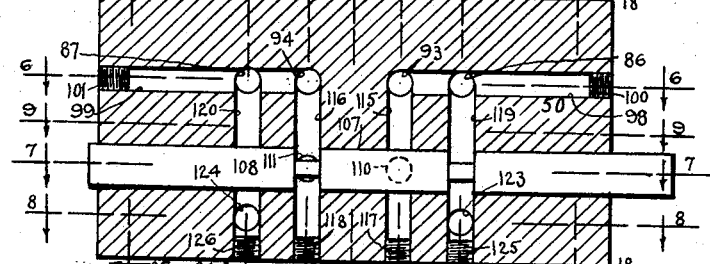
Figure 11:
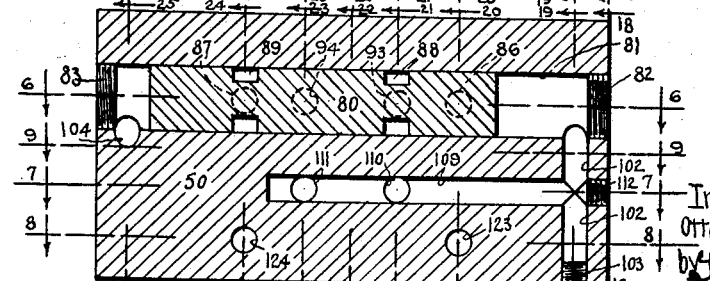

Study of Figure 7 will show that as each of the plungers 137 and 138 is projected momentarily outwardly there will result a reduction of the available space at that end of the structure for accommodation of liquid. It is here noted that each of the plates 141 and 142 which spans the outer end of one of the cylinders 131 and 132 is provided with an opening 160 (see Figures 17 and 18) to permit balancing of liquid and free interchange of liquid between the outer portion of each such cylinder and the proximate end space contained within the projection 157 or 158 as the case may be. As each of the plungers 137 and 138 is projected outwardly liquid contained against the outer face of such plunger will shift through the corresponding opening 160 to the space contained within the proximate extension 157 or 158, and upon return of such plunger liquid will follow the plunger back into the outer end portion of the cylinder. Thus a free interchange of liquid from and into the outer end portion of each cylinder is permitted as the respective plungers are driven outwardly and afterwards allowed to return inwardly under urging of the springs. Thus liquid lock at these points is avoided. However it is now noted that the out-throws of the plungers are not accompanied by simultaneous inward movement of their companions. That is, as each plunger is projected outwardly the other plunger does not execute any inward movement as it has already been restored to its inward position by its spring. It is thus needful to make provision for interchange of the liquid contained in each end space with some other space, even though the space within the other end extension remains unchanged. Such provision is made as follows:

Reference has been made to the balancing passage 159 shown in Figure 9 in particular. I have provided a passage 161 drilled inwardly of the valve block from its rear face at the level of the passage 159 and intersecting the vertical passage 120 which in turn intersects the horizontal passage 87 which terminates in the release port 52. Accordingly it is evident that free interplay of liquid may occur between both of the end spaces contained in the end extensions 157 and 158, and the release or low pressure side of the drive liquid system, thus avoiding any liquid lock due to the condition above explained. In this connection it is noted that the passage 161 intersects the vertical passage 120 just above the primary valve element 108, so that the movements of that valve do not in any manner interfere with the desired free shift of liquid just above explained.

Reference is now made to Figures 28 and 29 in which I have illustrated a modified combination which includes the valving arrangements above described in detail, but in combination with a plunger type of compressor element instead of the diaphragm type of compressor element. In the present case the valve block 50 is shown as before, to which is attached the plate 106; but said parts are here designated with like numerals but provided with the suffix "a." The valve block 50$^a$ is the same as that previously described, and it includes like valving arrangements, but in the present case I have made a slight change in the arrangements of the passages contained in said valve block as follows:

In the previous arrangement the inner ends of the cylinders 131 and 132 are connected to the vertical passages 133 and 134, respectively, by the short horizontal passages 135 and 136 (see Figure 7). Accordingly, in that previous construction the pressure existing at the inner end of each of the cylinders 131 and 132 is always the same as that existing in the corresponding vertical passage 133 or 134, as the case may be, and is thus also the same as that existing against the lower face of the corresponding diaphragm 63$^a$ or 63$^b$, as the case may be. In the modified arrangement of Figures 28 and 29 the short horizontal passages 135 and 136 have been eliminated thus isolating the cylinders 131$^a$ and 132$^a$ from direct communication with the pressure sides of the compressor elements, and passages 162 and 163 have been extended down from the plate 106$^a$ into direct connection with the cylinders 131$^a$ and 132$^a$, respectively. The vertical passages 133$^a$ and 134$^a$ have been retained in this modified arrangement, the pressure sides of the compressor elements being in connection with these passages 133$^a$ and 134$^a$, as before. By this isolation it is possible to effect the delivery of pressure liquid to the inner ends of the cylinders 131$^a$ and 132$^a$, respectively, not by use of an extra or "critical" pressure developed when the diaphragm reaches its limited movement, but rather by other means as will presently appear.

In place of the diaphragm units heretofore referred to I have provided the two cylinder and plunger units 164 and 165 which are located above the plate 106ᵃ. Each of these units 164 and 165 includes a lower cylinder 166 of smaller size and an upper cylinder 167 of larger size, and the plunger element includes the lower small element 168 working in the cylinder 166 and the upper large piston element 169 working in the cylinder 167. The elements 168 and 169 are connected together and reciprocate as a unit. Conveniently the piston element 169 is provided with conventional piston rings not numbered. Cylinder heads 170 are secured to the upper ends of the larger cylinder spaces 167, and bottom plates 171 are secured to the lower ends of the smaller cylinder spaces. The pipes 59ᵃ and 60ᵃ connect to the lower plates 171ᵃ and 171ᵇ so that the lower ends of the smaller cylinders are connected to the passages 133ᵃ and 134ᵃ for supply of pressure drive liquid and release of said liquid according to the arrangements prescribed by the valving arrangements already described. Inlet connections 173ᵃ and 173ᵇ connect into the upper ends of the two larger cylinders for supply of refrigerating medium to said cylinders under control of check valves 174ᵃ and 174ᵇ, and delivery connections 175ᵃ and 175ᵇ lead from the upper ends of such larger cylinders for delivery of the compressed refrigerating medium from said cylinders under control of check valves 176ᵃ and 176ᵇ, respectively. Both of the connections 175ᵃ and 175ᵇ are shown as being connected together by the line 176, and both of the connections 173ᵃ and 173ᵇ are generally connected together and to a common supply line (not shown). Upward drive of each plunger element is limited by a stud 177 carried by the upper face of the piston element 169 of such unit, or by a stud projecting down from the top plate or head 170.

The cylinder wall of each smaller cylinder element is provided with a delivery port 178 at the upper limit of travel of the corresponding smaller plunger 168, so that such port is uncovered just as the plunger element reaches its intended high point of travel. Each of these ports 178ᵃ and 178ᵇ (for the two small cylinders) is connected by a line 179 to the corresponding passage 163 or 162, as the case may be, leading to the inner end of the corresponding cylinder 131 or 132 as the case may be. Accordingly, just as each of the plunger elements reaches its intended high point of travel a connection of pressure drive liquid is established to the inner end of the corresponding cylinder 131 or 132, to thus effect throw of the valve mechanisms of the valve unit in accordance with the operations already explained. Such reversal of the valve mechanisms is thus made independent of creation of a "critical" pressure to cause throw of the valve mechanisms according to the previously described arrangements.

In the second modified arrangement shown in Figure 30 I have provided two vertical cylindrical chambers 180 and 181 whose lower ends are connected to the passages 133 and 134 by the pipes 59ᵇ and 60ᵇ, such pipes corresponding in all respects to like pipes 59 and 60 of the originally described arrangement; that is, with the modification now being described the passages 133 and 134 are directly connected to the rear ends of the corresponding cylinders 131 and 132 by the short connections 135 and 136 according to the original form of disclosure.

The upper end of each of the cylinders or chambers 180 and 181 is closed by a head plate 182. An inlet port 183 is provided in each of these head plates, and a connection 184 connects to each such inlet port for supply of low pressure refrigerating medium through the control of a check valve 185. A delivery port 186 is also provided in the head plate of each cylinder element, and preferably a shallow flange or rib 187 is provided around each such delivery port as shown in the figure. A light valve element 188 is pivotally connected to the lower face of each head plate by the pivot pin 189, the upper face of such valve element being suitably lined as at 190 to provide a good seal against the corresponding rib when the valve element is raised. Each such valve element is also provided with a downwardly facing shallow cup element 191, providing an inverted cup. A delivery connection 192 is connected to each of the ports 186, for delivery of compressed refrigerating medium from the corresponding cylinder, under control of a check valve 193. Conveniently both of these delivery connections are connected to a common delivery line 194; and generally both of the supply connections 184ᵃ and 184ᵇ will be connected to a common supply line (not shown).

With the above described arrangements of this second modification the following operations will occur:

As each of the lines or pipes 59ᵇ and 60ᵇ is brought into connection with pressure drive liquid such liquid will be driven up into the corresponding cylinder 180 or 181 to compress the refrigerating medium contained in such cylinder and drive such so-compressed medium out through the corresponding port 186. Thus the rising of level of such drive liquid into the cylinder will of itself effect compression of the refrigerating medium; and it is noted that conventional compositions of refrigerating media are only very slightly absorbed by conventional oils which might be used for the drive liquid so that although the refrigerating medium is in direct contact with the pressure drive liquid substantially no deterioration of either material will occur over an extended interval of use. As such drive liquid rises in the cylinder with corresponding displacement of refrigerating medium the surface of such drive liquid will presently come to the inverted cup element 191, raising the same by flotation, and thus closing the valve element against the rib when the rise has been completed. At such instant there will be an increase in pressure of the drive liquid according to the principles already explained so that the valve mechanisms will be caused to reverse, thus allowing the liquid contained in the chamber 180 or 181 to descend and be restored to the closed circuit driving system.

It is noted that in the cases of those embodiments in which the sudden operations of the plungers 137 and 138 are instituted by a rise of drive liquid hydraulic pressure at the completions of the working strokes of the diaphragms or the drive liquid levels (as in Figure 30) such sudden rise of drive liquid pressure may be due to the fact that flow of such drive liquid to the working element has been arrested at completion of such working stroke, so that losses of pressure between the pump 75 and the compressing element have substantially ceased, thus bringing the full pump pressure to bear against the working element. The unit may be designed to respond to such increases of pressure when the diaphragm type or the liquid surface type of compressing element is used.

I claim:

1. Liquid pressure operated compressing means, comprising in combination a compressor including at least a first pumping unit and a second pumping unit, each pumping unit including a chamber member having a movable wall element defining a drive chamber at one face of said wall element and a compression chamber at the other face of such wall element, inlet and outlet passages and valves in connection with each compression chamber and constituted for admission of compressible refrigerating medium into such chamber from the corresponding inlet passage with movement of the corresponding wall element in direction for enlargement of such chamber and for discharge of compressed refrigerating medium from such chamber through the outlet passage of such chamber with movement of the wall element in direction for reduction of size of said chamber, each movable wall element being constituted for decrease or increase of the volume of the corresponding compression chamber simultaneously with increase or decrease of the volume of the corresponding drive chamber, together with conduit means in connection with each drive chamber for supply of pressure drive liquid to and release of drive liquid from such drive chamber, valve means in connection with both of said conduit means, a pressure drive liquid connection to said valve means and a drive liquid release connection from said valve means, said valve means being provided with a main valve chamber, a conduit from the pressure drive liquid connection to the main valve chamber, a conduit from the main valve chamber to the drive liquid release connection, conduit means in the valve means extending between each drive chamber conduit means connection aforesaid and the main valve chamber, a main valve movably mounted in the main valve chamber and having a first defined drive liquid control position and having a second defined drive liquid control position, and formed to establish communication between the pressure drive liquid connection of the valve means and the conduit means of the first drive chamber and communication between the conduit means of the second drive chamber and the liquid release connection of the valve means when the main valve is in its first defined position, and to establish communication between the pressure drive liquid connection of the valve means and the conduit means of said second drive chamber and communication between the conduit means of the first mentioned drive chamber and the liquid release connection of the valve means when the main valve is in its second defined position, together with first shifting means to shift said main valve from the first defined drive liquid control position to the second defined drive liquid control position when the movable wall element of the first defined drive chamber reaches a predetermined extreme of movement of said movable wall element, and second shifting means to shift said main valve from said second defined drive liquid control position to said first defined drive liquid control position when the movable wall element of the second defined drive chamber reaches a predetermined extreme of movement of said movable wall element, each said main valve shifting means including a chamber having a movable pressure receiving surface, spring means urging the movable fluid pressure receiving surface of each main valve shifting means to a main valve non-shifting position, a conduit connecting each such chamber to the corresponding drive chamber, and means to deliver through each conduit to the full area of the corresponding movable fluid pressure receiving surface the fluid pressure in the corresponding drive chamber when the movable wall of such drive chamber is at its extreme driven position, together with adjustable means to pre-load each spring means to a predetermined amount of pre-loading.

2. Means as defined in claim 1, wherein the movable wall element one face of which defines the drive chamber of a pumping unit and the other face of which defines the compression chamber of such pumping unit comprises a flexible liquid tight diaphragm dividing the chamber member of such pumping unit between the drive chamber and the compression chamber of such unit, and which diaphragm has an extreme limit of movement in the direction of reduction of size of the corresponding compression chamber, and wherein said predetermined extreme limit of movement of the movable wall element is the extreme limit of movement of such diaphragm in the direction of reduction of size of the compression chamber.

3. Means as defined in claim 2, wherein the extreme limit of movement of the flexible diaphragm in the direction of reduction of size of the compression chamber comprises engagement of the diaphragm with the proximate inner surface of the compression chamber.

4. Means as defined in claim 2, wherein the extreme limit of movement of the flexible diaphragm in the direction of reduction of size of the compression chamber comprises the limit of flexible distention of the flexible diaphragm in the direction of movement of said diaphragm for reduction of size of the compression chamber.

5. Means as defined in claim 1, wherein the movable wall element one face of which defines the drive chamber of a pumping unit and the other face of which defines the compression chamber of such pumping unit comprises a plunger element movably mounted within the pumping unit, one face of such plunger element constituting one surface of the drive chamber and the opposite face of said plunger element constituting one surface of the compression chamber, and which plunger element has an extreme limit of movement in the direction of reduction of size of the corresponding compression chamber, there being a drive liquid delivery port in a non-movable wall of the drive chamber, the plunger element covering and sealing said port when said plunger element is in any position other than its position of extreme limit of movement in direction for increase in size of the drive chamber, and said port being open when the plunger element is in its extreme limit of movement in direction for increase of size of the drive chamber for delivery of drive liquid from such port at such time, and wherein the conduit which connects each valve shifting means chamber to the corresponding drive chamber is in connection with the aforesaid port of such drive chamber.

6. Means as defined in claim 1, wherein the means to shift the main valve from each of said defined control positions to the other defined control position comprises a plunger surface on each end of the main valve, together with primary valve means having a first position and a second position, and conduits between said primary valve means and the drive pressure liquid connection and the drive liquid release connection, and between the primary valve means and the end portions of the main valve chamber, said primary valve being constituted to admit pressure drive liquid into one end of the main valve chamber and to release drive liquid from the other end of the main valve chamber when the primary valve is in its first position, and to release drive liquid from the one end of the main valve chamber and to admit pressure drive liquid into the other end of the valve chamber when the primary valve is in a second position.

7. Means as defined in claim 6, wherein the primary valve is constituted for reciprocation back and forth between said first and second positions.

8. Means as defined in claim 1, wherein the movable fluid pressure receiving surface in each main valve shifting means chamber has an effective pressure receiving area which is greater when such plunger is shifted against its spring from its idle position than when in such idle position.

9. Means as defined in claim 7, wherein the conduit which extends between each plunger cylinder and the pumping unit drive chamber which corresponds thereto is in fluid connection with such drive chamber at all times.

10. Means as defined in claim 7, wherein the conduit which extends between each plunger cylinder and the pumping unit drive chamber which corresponds thereto is in fluid connection with such drive chamber only when the movable wall element of such pumping unit is at the limit of movement in the direction of increase of drive chamber size.

References Cited in the file of this patent

UNITED STATES PATENTS

| 2,260,306 | Ferguson | Oct. 28, 1941 |
| 2,607,197 | Johnson | Aug. 19, 1952 |

FOREIGN PATENTS

| 1,104,905 | France | May 18, 1954 |